Oct. 11, 1966    J. P. YELPO    3,277,934
QUICKLY DETACHABLE SUB-BASE FOR ELECTRIC HAND SAWS
Filed Sept. 23, 1964    2 Sheets-Sheet 1

INVENTOR.
Joseph P. Yelpo
ATTORNEY

Oct. 11, 1966  J. P. YELPO  3,277,934
QUICKLY DETACHABLE SUB-BASE FOR ELECTRIC HAND SAWS
Filed Sept. 23, 1964   2 Sheets-Sheet 2

WITNESS
William Martino Jr.

INVENTOR.
Joseph P. Yelpo
BY
Marshall J. Breen
ATTORNEY

United States Patent Office 3,277,934
Patented Oct. 11, 1966

3,277,934
QUICKLY DETACHABLE SUB-BASE FOR
ELECTRIC HAND SAWS
Joseph P. Yelpo, Plainfield, N.J., assignor to The Singer Company, New York, N.Y., a corporation of New Jersey
Filed Sept. 23, 1964, Ser. No. 398,659
3 Claims. (Cl. 143—43)

This invention relates to portable electric hand saws and more specifically to means including a detachable work-contacting subbase for readily and selectively adapting the same saw to a variety of uses.

It is customary to provide an electric hand saw with a fixed work-contacting base which is completely "wrapped around" the saw blade so that a stable support for the tool on the work is obtained. However, this makes it impossible to make a flush or close cut against a vertical surface with the same tool and requires, in the present state of the art, either a special saw or a special base plate which must be secured to the saw in place of the existing base plate. This is undesirable on the basis of either cost or the time delay necessary in making the base change.

This problem is solved according to the present invention by providing in the work-contacting base fixed to the saw an open-sided cut-out for the blade and then providing a second auxiliary work-contacting base which fits closely over the fixed base and may, when desired, be quickly secured to the fixed base and has structure which, in effect, "wraps around" the saw blade when in place and thus provides "all around" support. The fact that the fixed base does not have to be removed from the saw to accommodate the auxiliary or subbase greatly reduces the time necessary to make the change.

It is therefore an object of this invention to provide means for quickly converting a single electric hand saw to a variety of work requiring different base configurations for proper support.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the drawings, FIG. 1 is a bottom plan view of an electric hand saw, illustrating an embodiment of the invention.

Figure 1:
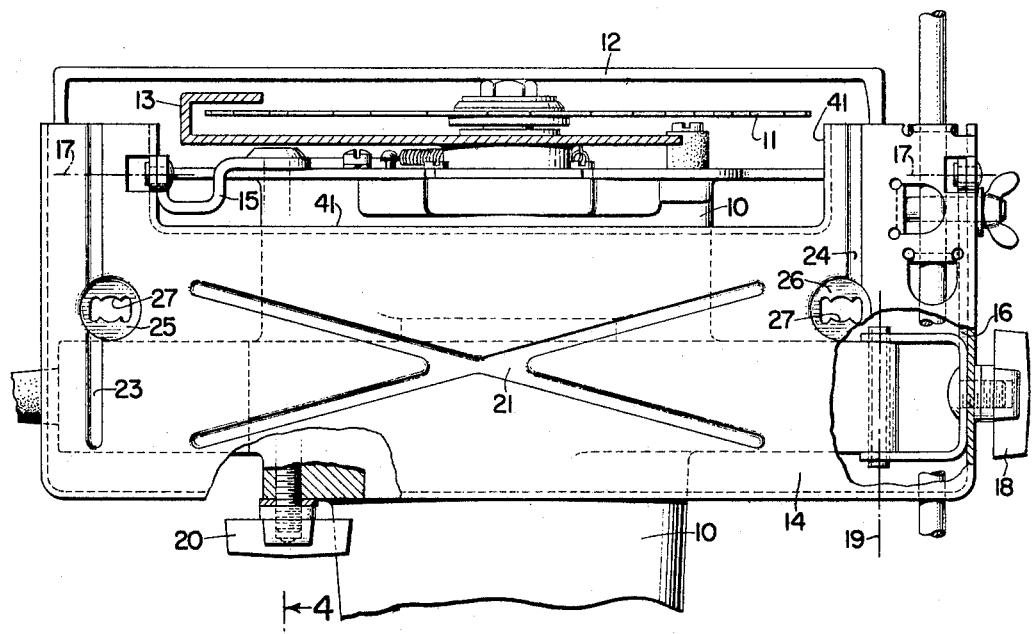

Referring to FIG. 1 there is shown an electric hand saw comprising a housing 10 in which is journaled a driven power spindle to which a rotary saw blade 11 is secured, said blade having a fixed blade guard 12, and a movable blade guard 13. A base plate 14 is hingedly secured to the housing 10 by pivoted sector plates 15 and 16 which permits angular adjustment of the housing about an axis 17 for angle cuts, with locking being accomplished by means of knob 18. The housing 10 is also pivotally secured to sector plate 16 for depth-of-cut adjustment about pivotal axis 19 and is locked in any desired position about this axis by means of knob 20.

The above structure is conventional and forms no part of this invention.

The fixed base 14 is formed with a die-pressed depression 21 in a crossed configuration which not only provides increased stiffness but also serves as a convenient guide for proper positional alignment for the secure attachment thereto of a subbase 22 as will be explained presently. Additional die-pressed linear depressions 23 and 24 may also be used to provide positional registry and increased lateral stiffness.

Figure 2:
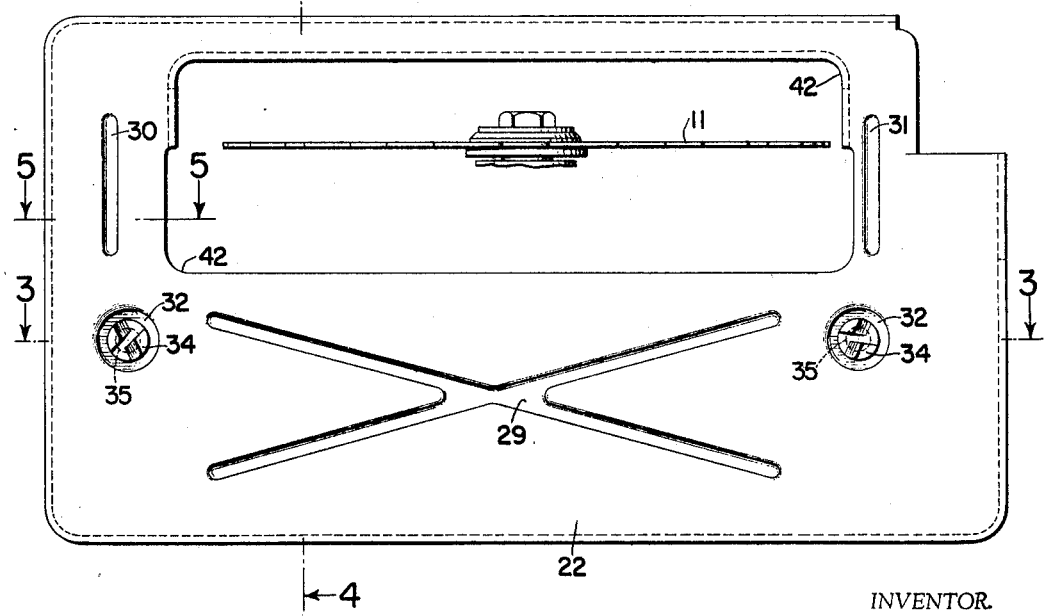
FIG. 2 is a fragmentary bottom plan view of the hand saw of FIG. 1 with the auxiliary base plate attached.
Figure 3:
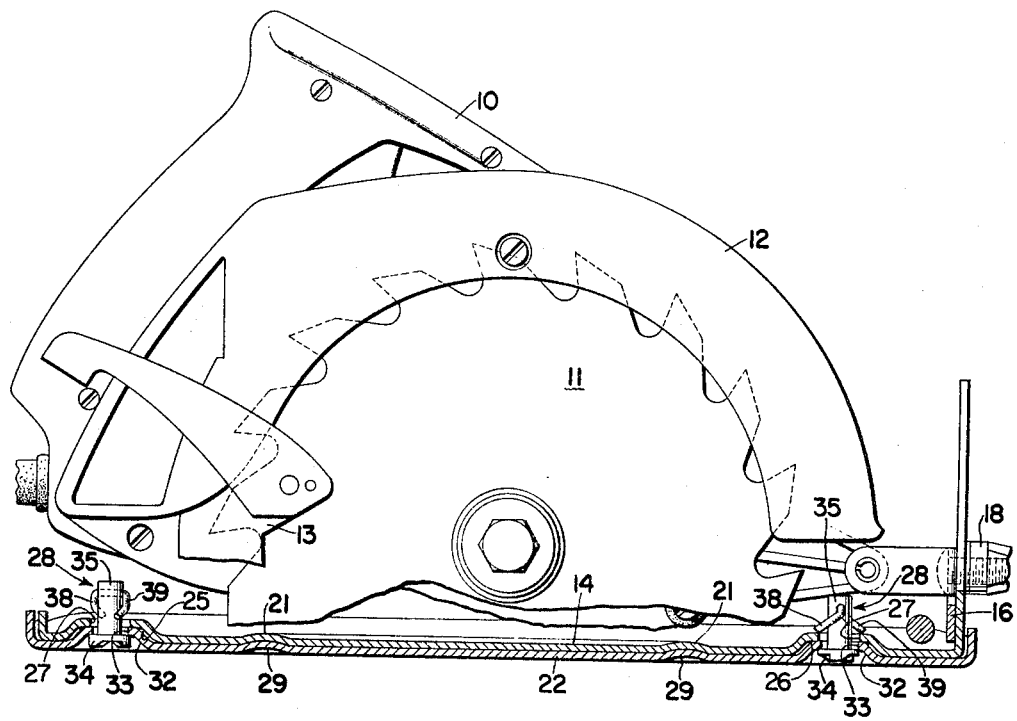
FIG. 3 is a vertical side elevational view of the hand saw of FIG. 2 with a partial section through the bases taken substantially on line 3—3 of FIG. 2.
Figure 4:
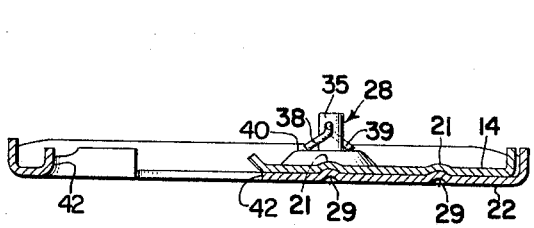
FIG. 4 is a detailed sectional view taken substantially on line 4—4 of FIG. 2.
Figure 6:
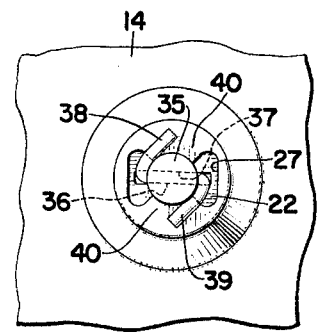
FIG. 6 is a detailed top plan view showing one of the spring fasteners used to secure the auxiliary base of this invention.
Figure 5:
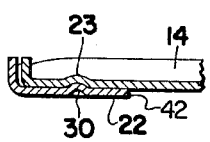
FIG. 5 is a detailed sectional view taken substantially on line 5—5 of FIG. 2.

Also pressed into the base 14 are two, spaced circular depressions 25 and 26 each having a special aperture 27 for receiving a conventional spring fastener 28 for quickly securing subbase 22 to the fixed base 14. The subbase 22 is shown in FIG. 2 as it would be secured to the fixed base 14 and in its assembled position relative to the saw blade 11 with all other details omitted for the sake of clarity. Depressions 29, 30 and 31, formed in the subbase 22, are adapted to register with the depressions 21, 23 and 24, respectively, of the fixed base 14 as seen in FIGS. 3, 4 and 5. Spaced circular depressions 32 formed in the subbase 22 have apertures 33 in which are held captive the fasteners 28 as seen best in FIG. 3. The fasteners 28 are provided with slotted head portions 34 recessed within the depressions 32 so that the lower surface of subbase 22 presents a smooth, flat unobstructed area for contacting and for sliding over the work. A shank portion 35 of the fastener 28 carries a spring wire 36 extending through a diametrical hole 37 with its opposite ends 38 and 39 bent downwardly and reversely as shown. These fasteners 28 are supplied before assembly with the spring wire 36 bent downwardly at the ends but not reversely, and, in this condition, are first inserted in the aperture 33 and then given a reverse twist to hold them captive but freely rotatable therein. It will be seen from FIG. 6 that the aperture 27 in the fixed base 14 is shaped to admit the passage of the twisted wire ends 38 and 39 whereupon a small turn of the fastener 28, as by a coin inserted in the slotted head portion 34, then brings the wire ends 38 and 39 over the land portions 40.

In this position, the wire ends 38 and 39 are stressed slightly to exert a resilient clamping force which holds the subbase 22 securely against the fixed base 14 and the registry of the mating depressions prevents any relative lateral movement which might otherwise be induced by friction with the work incident to the sawing operation.

It will be understood that the fixed base 14 is provided with an open-sided cutout 41 for the saw blade 11 to permit cuts as close up to a vertical surface as the guard 12 will permit. However, this base 14 would not be suitable for jobs where support on all sides of the saw blade is required and for this purpose the subbase 22 is used. The subbase 22 has a saw blade opening 42 of the completely surrounded type and provides support on all sides of the blade 11 as clearly seen in FIG. 2. That is to say, the blade opening 42 is formed entirely within the confines of the auxiliary base 22.

The fact that the subbase 22 is used in addition to, rather than in substitution for, the fixed base 14 yields an unusually stable support for the saw when it is needed because the stiffness is, in effect, doubled.

From the above description it will be perceived that there is provided according to this invention simple means for quickly attaching and detaching a subbase to and from a hingedly fixed base of a portable hand saw and in easily repeatable proper registry to extend the use of the same saw to a wide variety of work.

Having thus described the nature of the invention, what I claim herein is:

1. In a portable electric hand saw having a housing, a driven spindle journaled in said housing, a saw blade secured for rotation with said spindle, a base hingedly secured to said housing for contacting the work on one side of said saw blade, means adapting said hand saw for different work comprising, an auxiliary work-contacting base having a blade opening formed entirely within the confines of said auxiliary base and means for detachably securing said auxiliary base to said hingedly-secured base to provide a stable selective support for said hand saw in work areas lying on both sides of said saw blade.

2. Apparatus according to claim 1 in which the detachably securing means comprises fasteners held captive in spaced apertured recessed portions of the auxiliary work-contacting base.

3. Apparatus according to claim 1 in which the hingedly-secured base and the auxiliary base are formed with inter-engaging depressions on their work-contacting surfaces.

References Cited by the Examiner
UNITED STATES PATENTS 1,850,444   3/1932   Brumell _____ 143—43

FOREIGN PATENTS 356,587   10/1961   Switzerland.

WILLIAM W. DYER, Jr., *Primary Examiner.*

W. D. BRAY, *Assistant Examiner.*